United States Patent Office 3,421,648
Patented Jan. 14, 1969

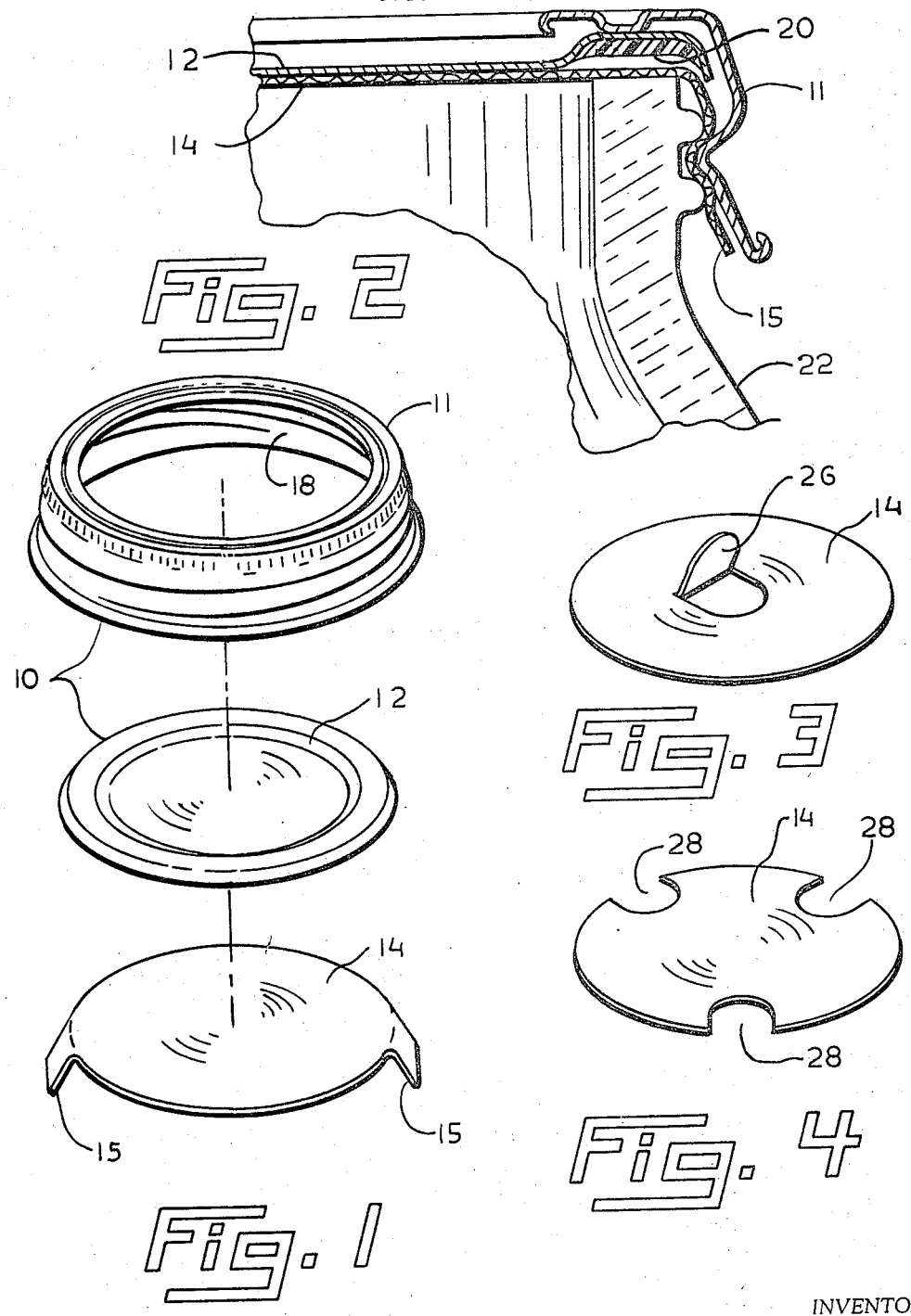

3,421,648
STORAGE ASSEMBLY FOR HOME
FOOD PROCESSING CLOSURE
Donald A. Giessler and Floyd A. Ratliff, Muncie, Ind., assignors to Ball Brothers Company Incorporated, Muncie, Ind., a corporation of Indiana
Filed Dec. 6, 1966, Ser. No. 599,598
U.S. Cl. 215—40      7 Claims
Int. Cl. B65d 23/00; B65d 41/08; B65d 45/30

ABSTRACT OF THE DISCLOSURE

A storage assembly for two-component closures wherein the lid portion is secured within a cylindrical securing band by retaining means, such as a disk insert, which engages the walls of the band and holds the lid between the retaining means and a lip at one end of the securing band, thereby forming a unitary assembly for convenient and sanitary storage.

---

This invention relates to a storage assembly for container closures. More particularly, this invention relates to a packaging or storage assembly for home food processing closures.

The home food processing closures with which this invention are concerned are usually two-component units, including an annular securing ring or band and a lid. Consideration of the mechanism of food processing will clarify the function of this specialized two-component closure.

Home food processing, or "canning," involves the treatment of food products to protect against spoilage. Since spoilage is primarily due to microorganisms, food processing is accomplished by destroying microorganisms in the food product and thereafter protecting the food product against re-introduction of such microorganisms.

Heat is utilized to destroy microorganisms in home food processing. Containers filled with the food product are placed in a boiling water bath or pressure cooker and heated for a sufficient time to destroy the microorganisms in the food product. Obviously, a closed container cannot be so heated without danger of explosion. However, an open container may permit microorganisms to enter after processing. It is also preferred that oxygen be purged from the container to further preclude microorganism growth and to protect against harmless, but objectionable, color changes in the food product.

Venting and sealing of the container, and production of an inert atmosphere and partial vacuum, are accomplished by the two-component closure. The securing ring fastens onto the container but leaves the top thereof open except for an inwardly extending flange or lip. While the securing band may be fastened to the container by several means including a press fit, it is preferable that the securing band include a threaded cylindrical portion which cooperates with threads on the container. In another embodiment the securing band may utilize inwardly extending projections to engage a simple outwardly extending ring on the neck of the container. The lid is positioned between the container top and the inwardly extending lip. The area of the lid which contacts the top of the container is provided with a sealant, such as rubber or a plastisol. Though the securing ring holds the lid in close association with the container top, it does not initially urge the lid onto the container top in such a manner as to accomplish sealing of the container against venting. Thus, upon heating of the food product, the pressure created by the steam which is generated, lifts the lid, and permits the steam to escape between the container and lid. Substantially all of the air in the container is also purged by the escaping steam. After being heated for a sufficient time to destroy the microorganisms, the steam is allowed to condense. This, of course, creates a lower pressure inside the container than that of the surrounding atmosphere. Sealing of the lid is accomplished by the force generated by the difference in pressure across the area of the lid.

Put another way, the two-component closure functions as a one-way valve, enabling steam and air to escape from the container upon heating, but preventing entry of matter when the pressure differential is reversed. This pressure differential immediately seals the container and protects against introduction of microorganisms while providing a desirable partial vacuum within the container.

It will be recognized from the above discussion that the two-component closure is not an ornamental unit. Rather, it is a highly specialized and functional closure.

Cost is, of course, an important consideration in an item used in home food processing. Fortunately, the two-component closure can be economically produced. However, since the closure is intended for use with food and includes a sealing surface, it must be carefully handled during storage. Generally, the closures are restored and sold by placing them on containers with the sealing portion of the lid away from the container and towards the securing band. However, this exposes the food-contacting portion of the lid to possible contamination and/or damage. On the other hand, if the lid is placed towards the container, the edge of the container contacts and may damage the sealant on the lid. Further, since the lid and the securing band are not secured together until placed on a container, it has proven necessary to assemble the components by hand and then place the assembled closure upon a container by hand. This, of course, produces very high labor expenses for a low cost article.

Therefore, it is an object of this invention to provide a two-component home food processing closure storage assembly which affords sanitary protection for the food-contacting portion of the lid.

Another object of this invention is to provide a two-component home food processing closure which protects the sealant from damage when in storage.

Yet another object of this invention is to provide a two-component food processing closure assembly which forms a stable unit when assembled.

Still another object of this invention is to provide a two-component food processing closure assembly which may be applied to containers by machine.

Other objects of this invention will be apparent from the drawings and following discussion.

According to the instant invention, lids are held in securing band by retaining means. The retaining means may be wire member, i.e., snap rings, wood sticks, or, preferably, basically disk-shaped inserts. In simplest forms, the insert may be of a disk of, for instance, paper, plastic, or metal, which secures the lid within the securing band by a press fit within the securing band. Preferably, however, the insert is paper and includes projections along the periphery which folds along the securing band to permit convenient removal of the insert. A particularly advantageous embodiment is one in which two opposing ears are provided on the insert. Also, the disks may employ indentations along the periphery or central tabs to aid in removal. In any event, the retaining means should be such as to alert the ultimate user to the need for removal of the retaining means before use.

The function of the retaining means is to retain the lid within the securing band and to protect the sealant on the lid from damage by the sealing portion of the container. This enables the lid to be placed in the securing band and secured with the food-contact portion towards the interior of the container, and, in the preferred embodiment, protected by the insert. Also, a stable unit which may be applied to containers by machines is provided. When screwed on the container, the insert is interposed between the sealant on the lid and the sealing surface of the container. Thus, the fragile sealant is protected from damage and the food-contacting portion of the lid is not exposed.

The retaining means of the instant invention should not be confused with gasket inserts used in one-piece closures. Such gasket inserts are used in one-piece closures to provide sealing. However, the retaining means of the instant invention is included to provide a sanitary and convenient unit. The retaining means is, of course, discarded before the closure is employed to seal containers.

The invention will be more readily understood upon reference to the drawings, in which:

FIGURE 1 is an exploded view of the closure and disk insert;

FIGURE 2 is a cross-sectional view of the closure and insert mounted upon a container; and FIGURE 3 and FIGURE 4 are views of other forms of disk inserts.

Two-component closure 10, shown in FIGURE 1, is formed of securing band 11 and lid 12. Retaining means in the form of insert 14 is of such a diameter as to snugly fit into securing band 11, and is provided to retain and protect lid 12. Projections 15 of insert 14 fold along threads 18 of securing band 11, when insert 14 is placed in securing band 11.

As illustrated in FIGURE 2, insert 14 is between lid 12, and particularly sealant 20, and container 22. Folded projection 15 is not of such thickness as to interfere with the securing of securing band 11 onto container 22, though positioned therebetween. Projection 15 forms a convenient grasping point for removal of insert 14 from securing band 11.

FIGURE 3 illustrates another form of insert 14 wherein convenient removal is provided by tab 26 which lies flat and protects the lid until pulled perpendicularly to the insert 14 and which is properly grasped for removal. Yet another variation is shown in FIGURE 4 in which insert 14 includes indentations 28 to facilitate removal of insert 14.

The storage assembly of the instant invention permits machine handling and application of caps even when the lid is disposed in the securing band with the sealant portion of the lid in the exposed or nominally "up" position. Of course, it is preferable that the sealant portion of the lid be away from the ridge of the securing band, but a number of the advantages of the storage assembly accrue from the less desirable orientation.

It will be apparent from the above discussion that the storage assembly of the instant invention affords a sanitary method of retaining securing band and lids into a unit which may be handled by machines. Also, the preferred embodiment of the assembly affords protection against damage to the sealant portion of the lid.

Since, as is evident from the above description, various modifications in the storage assembly may be made within the scope of the invention, the invention is not intended to be limited to the specific details described herein.

What is claimed is:

1. A storage assembly for a two-component closure comprising a securing band having an inwardly extending lip at one end thereof, a lid disposed within said securing band, and retaining means positioned transversely to and wholly within said securing band with said lid positioned and secured between said securing-band lip and said retaining means.

2. A storage assembly as set forth in claim 1 wherein said retaining means is a disk press-fitted into said retaining band.

3. A storage assembly as set forth in claim 2 wherein flexible projections are secured on the periphery of said disk whereby the storage assembly can be conveniently disassembled.

4. A storage assembly set forth in claim 2 wherein said disk is comprised of paper.

5. A storage assembly for home food processing lids comprising an annular securing band of cylindrical shape with a screw thread portion defined in the interior of the cylindrical portion and an inwardly extending lip at one end of the cylindrical portion, a circular lid having a sealant along the edge of one side and sized to fit within but not pass through said securing band, said lid being positioned in said securing band with the sealant free-side of said lid in contact with said securing-band lip, and a disk-shaped insert comprised of paper press-fitted into said securing band to secure said lid between said insert and said securing-band lip.

6. A storage assembly as set forth in claim 5 wherein at least two projections which provide means for removing said insert from said securing ring are disposed along the edge of said paper insert.

7. A closure storage assembly comprising a securing band having on one edge thereof an inwardly extending lip and the inner wall of which has inwardly protruding fastening means spaced from said lip and protruding inwardly a distance less than does said lip, a lid having a diameter such that said lid is freely movable past said fastening means within said securing band but is retained by said lip, and readily removable retaining means contacting the inner wall of said band for retaining said lid between said lip and said retaining means within said band to prevent premature disassembly, said retaining means being disposed entirely within said band.

References Cited

UNITED STATES PATENTS

| 2,033,187 | 3/1936 | Dolan | 229—43 |
| 2,310,113 | 2/1943 | Plochman | 215—31 |
| 2,449,014 | 9/1948 | Shaffer | 215—97 |
| 2,760,665 | 8/1956 | Zenker | 215—97 |
| 2,837,263 | 6/1958 | Nasello | 229—43 |

WILLIAM T. DIXSON, Jr., *Primary Examiner.*

U.S. Cl. X.R.

215—97